Patented July 9, 1940

2,207,470

UNITED STATES PATENT OFFICE 2,207,470

TREATMENT OF OOZE TO ENABLE IT TO BE TRANSPORTED

Ottomar Weber, Kurort Rathen-on-the-Elbe, Germany

No Drawing. Application May 12, 1938, Serial No. 207,589. In Germany August 7, 1934

5 Claims. (Cl. 71—16)

The ooze, soft mud or slime which forms chiefly at river estuaries and is used for fertilizing purposes, has been employed hitherto in such a manner that upon extracting the ooze it has been deposited in special reservoirs or the like by dredging, in order to liberate as far as possible the slime from the brine, which damages the soil and increases the cost of transport.

The slime which has been dispersed colloidally in sea water is transformed into a greasy state and cannot be brought again into the original colloidal form. In this state it is very difficult to treat the ooze, due to its extraordinarily tenacious capacity of binding when being picked up for loading; the spade, for example, must be immersed in water before each digging. It is very difficult, in fact almost impossible, for the ooze in this state to be distributed evenly over the land. Owing to this fact, the ooze is left all through the winter in very small heaps, under which treatment it becomes frozen throughout and afterwards crumbly and can be spread upon the ground in the following spring by smashing into pieces and pulverising. This procedure in spreading the ooze upon the ground is very protracted and furthermore increased fertility of the ground is only apparent as a rule after two years. The main disadvantage of this manner of treatment however, lies in the fact that the ooze from a biological point of view shows a significant change compared with the freshly gathered slime. Apart from the mineral fertilizing constituents there is a rich bacterial life in the fresh ooze. During the above mentioned storage the greater part of the bacteria is destroyed, due to lack of air.

By the method proposed by the present invention it is intended to economically prepare ooze for distribution in agricultural pursuits while preserving its natural rich bacteria content instead of using greasy ooze or ooze converted into other forms therefrom. It is thus possible to readily transport and apply ooze to a field in which crops are to be grown, thereby greatly increasing the biological condition or fertility of a selected soil more rapidly than hitherto possible in using materials of this nature.

Since the ooze such as deposited at the estuaries of rivers contains the maximum amount of living organisms, and, therefore, as first recovered, is in itself a good fertilizer, the main object of the invention is to preserve and prepare it for ready transport and also facilitate its application to the surface of a field to improve the character of the soil. That is to say, the invention is not concerned with the production of a concentrated, augmented, or supplemented fertilizer, using the ooze as a base, but, on the contrary, is solely concerned in the preparation and handling of the ooze in such a way as to maintain its natural bacterial content during transportation and handling. More simply stated, the idea of the invention is to take the ooze in its original form, just as it is extracted from natural bodies of water and without chemical change render it easily transportable.

For this purpose the method of the present invention consists firstly in freeing the fresh ooze only from superfluous sea-water, that is to say, to a point at which the ooze is of the consistency of a pulp capable of flowing, and then to convert it directly into an air conditioned form by the simple addition of sand or similar non-absorbent particles. Each grain of sand becomes then covered with a thin layer of ooze which remains adhered to it so that it becomes the carrier for its layer of ooze. The result is that with correctly selected proportions so that the mixture consists only of such ooze covered sand grains but does not otherwise contain pure ooze in bulk, the air can penetrate into the loose mixture if the material is not piled too high. This admission of air not only maintains the useful bacterial life, but also promotes the killing of noxious bacteria. The mixture also can be easily spread on the fields. Nevertheless, the ooze adhering to the grains of sand remains in its original state of humidity and particularly in its original colloidal condition, which is important for its vitalizing effect on the ground, particularly with light soil. The mixture is, if necessary, dried still further up to a water content of 25–40%; the quantity of sand which is added to the ooze is, apart from the water content of the ooze, determined also by the state of the ooze, whether or not it is more or less tough or capable of binding. The ooze is different in the various beds in its composition and varies in its physical state; a greasy tough ooze necessitates more sand despite the smaller water content, than ooze which is less tough and greasy and possesses greater water content. As on the other hand, however, a larger addition of sand has an advantageous effect upon heavy soils, the use to which the ooze is put determines the quantity of sand to be added. In accordance with the aforesaid, the addition of the percentage amount of sand must be determined for each sort of ooze by experiment having regard also to the purpose for which it is required. The most frequent mean value will be between 10–40% of the transportable mixture.

The preliminary drainage of the water may be effected for example by allowing to stand a short time or by centrifuging.

The hydro-extracting of waste water clearing sludge is already known. In this case it is a matter of getting the dry ingredients of a clear sludge as dry as possible and no care is required to be taken that a definite content of liquid will be obtained along with the dry matter, as otherwise this will be without value; apart from this hydro-extractors can be worked only in batches.

In connection with ooze, other considerations, however, have to be taken into account. There is the question primarily of the number of bacteria present together with the amount of mineral matter and these valuable ingredients are found in colloidal form in the sea-water. The problem with which the present invention is concerned is therefore different and consists in eliminating possibly only a certain amount of pure sea-water and to obtain the ooze in the form in which it is deposited that is to say, in the same state as deposited in the sea ground. This is, however, in the form of a colloidal mud or ooze of a very high water content which can be regarded more as thick liquid than a dry substance. Moreover, it is already from the transport point of view important to eliminate the sea-water to be extracted as quickly as possible, that is to say even on board the dredger without losing valuable matter. This extraction should be carried out in continuous working conditions because otherwise it will be difficult to handle large quantities. This task can be carried out in accordance with the present invention by a proper separator such as known in farming for skimming milk; broadly, however, by all separators capable of separating liquids in accordance with the difference in their specific gravities.

Instead of using sand, other matter may also be employed which is not in the condition of sand in the working situations. On rocky coasts, for example, rock such as granite, basaltic rock and the like, may be ground. Generally, all small grain substances can be employed which are only slightly or not at all absorptive. They must only be adapted in accordance with their nature to the purpose for which they are to be used. It is conceivable that for certain kinds of ground dust from Thomas's slag may be used.

Dry and sufficiently pulverized ooze can also be employed instead of sand. Such ooze can, as already known, be obtained by the fact that one can deposit fresh ooze by storing and afterwards to keep it over the winter in small heaps of a size permitting the heap to be frozen throughout so that afterwards the heaps may be broken up and pulverized. It is not, however, important for the invention how the drying procedure is carried out, but it is important that the individual grain in such old ooze grit is sufficiently dry in order to be capable of serving as a nucleus for the fresh ooze to be added to which this ooze adheres, but that this grain at the same time contains still a certain humidity which prevents it to act as an absorbent. As the ooze can be obtained in very varied compositions, it is a matter of simple experiment to ascertain for each individual case the most favourable condition of dryness of the old ooze grit. There are some cases in which mud grit which on account of greater dryness is slightly absorptive is mixed with fresh ooze containing an excessive amount of liquid so that an equilibrium takes place in the mixture.

By these means the sand ballast in the mixture which does not contain valuable ingredients receives in the known ooze grit a substitute which, from the biological point of view, is of inferior quality, but possesses, however, at least its valuable contents of inorganic substances and in addition also dry mould. The value of the mixture is by this means increased. Particularly for the cultivation of pure sand soil which hitherto was practically impossible, this increase of value is of importance. Further, it is now possible to work up ooze with high contents of sand or of small value as dry grit with fresh high value ooze.

This procedure can also be applied to similar substances of sludge on rivers, seas and ponds, which are from a biological point of view highly valuable in a fresh state, but in an old state still possess at least certain inorganic ingredients of value. Furthermore dry grit of such sludge may also be mixed with fresh ooze or, vice versa, the dry ooze with such fresh sludge.

This treatment of the ooze takes place approximately immediately after recovery, so that there is no time for depositing. Also during the storage and transport of the mixture, air admission must be provided, if the purpose of the method in accordance with the present invention is to be achieved, that is to say that the ooze receives its optimum conditions for the bacteria. Under this supposition no limitation is made in regard to its transport. The ooze must be packed and sent, for example in perforated vessels such as wooden casks, or arranged in such shallow layers that no large quantity is excluded from air.

*Example*

The ooze conveyed by means of suction dredger contains for example in a total of 1,000 kg., a water content of 80% and 20% of dry substance. A separator of an output of 10 cubic metres per hour separates for example this raw ooze in 6–7 cbm. of water and 3–4 cbm. of ooze in the form of a pulp thin enough to flow. In this state the water contents come to 50%–60% of the dry substance. This pulp-like ooze mass weighing approximately 300–320 kg. receives an addition of 100–150 kg. of fine sand so that 400–470 kg. of finished mixture is obtained.

After the introduction of the sand, the mixture may be brought into suitable drying devices, for the purpose of further drying. However, it is necessary for the maintenance of the biological properties that the moisture content should be maintained at 25%–40%.

The method of the invention can also be applied to other kinds of ooze, such as sea-ooze, which are of a particularly high biological value and which should be brought to the place where it is to be used without losing more than necessary of this high value.

I claim:

1. A method of preparing ooze for transportation and preserving the natural form in which it exists in river beds until application to a field for growing crops which consists in removing 60%–75% of the free water to obtain a residue of wet pulp, then admixing sand with said pulp to the extent of 10%–40%, by volume, of the transportable mixture.

2. A method of preparing ooze for transportation and application to a field for growing crops while preserving and protecting the bacterial life contained therein in the natural state existing at the bottom of bodies of water, such as river beds, ocean beds, lakes, ponds, or the like, which consists in removing the ooze from the water bed, extracting the bulk of free water to produce a mass of ooze sufficiently thin to flow, and subsequently mixing with said mass a finely divided non-absorptive material whereby the grains of said finely divided material become coated with the ooze whose outer surface only dries in a thin film thereby to hold water to keep the bacteria alive and produce a relatively loose partially aerated mixture which may be readily stored, transported and handled to permit distribution on the field.

3. A method according to claim 2, wherein the finely divided substance is ocean sand.

4. A method according to claim 2 wherein the finely divided substance is dry substantially non-absorptive mud grits.

5. The method set forth in claim 2, wherein the extraction of the bulk of free water is accomplished by centrifuging in separators.

OTTOMAR WEBER.